(12) United States Patent
Okamura et al.

(10) Patent No.: US 11,465,042 B2
(45) Date of Patent: Oct. 11, 2022

(54) GAME CONTROLLER

(71) Applicant: Nintendo Co., Ltd., Kyoto (JP)

(72) Inventors: Takanori Okamura, Kyoto (JP); Masaya Takei, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 17/366,960

(22) Filed: Jul. 2, 2021

(65) Prior Publication Data
US 2022/0001273 A1 Jan. 6, 2022

(30) Foreign Application Priority Data

Jul. 3, 2020 (JP) .............................. JP2020-115698

(51) Int. Cl.
*A63F 13/24* (2014.01)
(52) U.S. Cl.
CPC .................................. *A63F 13/24* (2014.09)
(58) Field of Classification Search
CPC .......................................................... A63F 13/24
See application file for complete search history.

(56) References Cited

U.S. PATENT DOCUMENTS

| | | | | |
|---|---|---|---|---|
| 2001/0044281 A1* | 11/2001 | Peterzell | ............. | H04M 1/0262 455/575.1 |
| 2003/0103042 A1* | 6/2003 | Moriyasu | ............. | G06F 1/1626 345/169 |
| 2013/0281212 A1 | 10/2013 | Tsuchiya et al. | | |
| 2014/0018173 A1* | 1/2014 | Urhman | ............. | A63F 13/24 463/37 |
| 2016/0164062 A1* | 6/2016 | Liu | ............. | H01M 10/425 429/121 |
| 2017/0106275 A1 | 4/2017 | Tsuchiya et al. | | |

(Continued)

FOREIGN PATENT DOCUMENTS

| | | |
|---|---|---|
| CN | 208356089 | 1/2019 |
| CN | 208422975 | 1/2019 |

(Continued)

OTHER PUBLICATIONS

Nintendo—"Super Nintendo Entertainment System (TM) Controller", Dec. 8, 2019 (Dec. 8, 2019), XP055862611, Retrieved from the Internet [retrieved on Nov. 17, 2021], 3 pages. https://web.archive.org/web/20191208073234/https://store.nintendo.com/super-nintendo-entertainment-system-controller.html.

(Continued)

*Primary Examiner* — James S. McClellan
*Assistant Examiner* — Peter J Iannuzzi
(74) *Attorney, Agent, or Firm* — Nixon & Vanderhye PC

(57) ABSTRACT

A game controller according to the present disclosure includes: a housing; and an internal structural body accommodated inside of the housing. The internal structural body includes at least: an internal frame having an installation surface and a recess adjacent to the installation surface; a battery that is accommodated in the recess of the internal frame and has a first surface that opposes a bottom surface of the recess and a second surface on a side opposite to that of the first surface; and a flexible substrate that is installed on the installation surface of the internal frame and includes a conductive pattern. The flexible substrate is arranged so as to cover at least a portion of the second surface of the battery accommodated in the recess.

9 Claims, 13 Drawing Sheets

(56) References Cited

U.S. PATENT DOCUMENTS

| | | | |
|---|---|---|---|
| 2017/0354869 A1 | 12/2017 | Suetake et al. | |
| 2017/0354872 A1* | 12/2017 | Suetake | A63F 13/24 |
| 2020/0006988 A1 | 1/2020 | Leabman | |
| 2020/0078670 A1* | 3/2020 | Oh | A63F 13/92 |
| 2021/0104907 A1* | 4/2021 | Chen | H01M 50/296 |
| 2021/0197075 A1* | 7/2021 | Seibert | G06F 3/0338 |

FOREIGN PATENT DOCUMENTS

| | | |
|---|---|---|
| EP | 2 698 185 | 2/2014 |
| JP | 2017-217412 | 12/2017 |

OTHER PUBLICATIONS

Polygon—"SNES-style controllers confirmed for the Nintendo Switch", Sep. 4, 2019 (Sep. 4, 2019), XP055862610, Retrieved from the Internet [retrieved on Nov. 17, 2021], pp. 1-3. https://www.polygon.com/2019/9/4/20849110/nintendo-switch-snes-wireless-controllers-price-release-date.

Extended European Search Report dated Nov. 30, 2021 in corresponding European Application No. 21183626.7, 7 pages.

* cited by examiner

GAME CONTROLLER

This application claims priority to Japanese Patent Application No. 2020-115698 filed on Jul. 3, 2020, the entire contents of which are incorporated herein by reference.

TECHNICAL FIELD

The present disclosure relates to a game controller.

BACKGROUND ART

JP 2017-217412A discloses a game controller. This game controller includes a housing, and an internal structural body that is accommodated in the housing. The internal structural body includes an internal frame, multiple substrates, and a battery, and the battery is arranged between a substrate and an inner wall surface of the housing.

SUMMARY

The present disclosure aims to provide a game controller according to which it is possible to make an internal structural body of a game controller more compact.

A game controller according to the present disclosure includes: a housing; and an internal structural body accommodated inside of the housing, in which the internal structural body includes at least: an internal frame having an installation surface and a recess adjacent to the installation surface; a battery that is accommodated in the recess of the internal frame and has a first surface that opposes a bottom surface of the recess and a second surface on a side opposite to the first surface; and a flexible substrate that is installed on the installation surface of the internal frame and includes a conductive pattern, the flexible substrate is installed so as to cover at least part of the second surface of the battery accommodated in the recess, and a first height, which is a height from the bottom surface of the recess to the installation surface, is greater than a second height, which is a height from the bottom surface to the second surface when the battery is accommodated in the recess.

According to this configuration, a recess that can accommodate the battery is formed in the internal frame, and since a region for arranging the battery need not be separately provided in the internal structural body, it is possible to make the internal structural body compact. Also, although a flexible substrate is provided so as to cover at least part of the second surface of the battery, due to the fact that the flexible substrate generally has a thin sheet shape, the volume does not increase even if the flexible substrate is arranged overlapping with the battery. Accordingly, this also contributes to making the internal structural body compact.

Also, since the first height, which is the height from the bottom surface of the recess to the installation surface, is greater than the second height, which is the height from the first surface to the second surface of the battery accommodated in the recess, a gap can be formed between the battery and the flexible substrate, and it is possible to suppress a case in which the battery and the flexible substrate come into contact with each other.

Note that although the recess is adjacent to the installation surface in the internal frame, this encompasses not only a case in which the recess and the installation surface are in direct contact with each other, but also a case in which they are adjacent to each other with another member, a gap, or the like interposed therebetween.

In the above-described game controller, the flexible substrate can be configured to cover part of the second surface of the battery.

According to this configuration, the flexible substrate covers part of the battery, and therefore it is possible to reduce the number of locations at which the swollen battery and the flexible substrate come into contact with each other when the battery swells. That is, it is possible to reduce the likelihood of contact between the battery and the flexible substrate.

In the above-described game controller, the flexible substrate can be configured not to cover the center of the second surface of the battery.

When the battery swells, there is a possibility that its central portion will swell compared to other portions. Accordingly, if the flexible substrate does not cover the center of the second surface of the battery, it is possible to further suppress the likelihood of contact between the battery and the flexible substrate.

In the above-described game controller, the internal frame can include a retaining member that covers at least part of a portion of the second surface of the battery that is different from the portion covered by the flexible substrate.

According to this configuration, in the battery, the portion that is not covered by the flexible substrate is covered by the retaining member, and therefore it is possible to suppress a case in which the battery comes out of the recess. Also, since the retaining member is configured to cover part of the second surface of the battery, for example, the battery can be accommodated in the recess by being inserted in the recess from the side on which the retaining member is not provided, and toward the lower portion of the retaining member. Accordingly, even if the retaining member is provided, it is easy to accommodate the battery. On the other hand, since the portion of the second surface of the battery that is not covered by the retaining member is covered by the flexible substrate, it is possible to further suppress a case in which the battery comes out.

Although there is no particular limitation on the mode of the retaining member, the retaining member can be configured to protrude toward an inner side of an opening of the recess from a peripheral edge of the opening, and the flexible substrate can be arranged on a side of the opening opposite to the side on which the retaining member is provided. Accordingly, the second surface of the battery is covered by the retaining member and the flexible substrate, which are arranged on mutually opposite sides, and therefore it is possible to further suppress a case in which the battery comes out of the recess.

In the above-described game controller, a plurality of operation members can be further included, the installation surface can have a first support surface and a second support surface that are arranged such that the recess is interposed therebetween, the flexible substrate can be installed on at least the first support surface and the second support surface, and the operation members can be respectively arranged at a position corresponding to the first support surface and a position corresponding to the second support surface on the flexible substrate.

According to this configuration, the installation surface of the internal frame includes a first support surface and a second support surface between which the recess is interposed. Here, the flexible substrate is deformable, and therefore it is possible to arrange the flexible substrate so as to extend from the first support surface, through the recess, and to the second support surface. That is, since the first support surface and the second support surface, on which operation members are respectively arranged, can be covered by one flexible substrate, it is possible to increase the degree of freedom in the design of the internal structural body. Using one flexible substrate contributes to reducing the cost as well.

In the above-described game controller, the portion of the flexible substrate that covers the recess can be provided with flexure.

According to this configuration, since the portion of the flexible substrate that covers the recess is provided with flexure, for example, when the battery swells, it is possible to suppress a case in which a tensile force acts on the flexible substrate even if the battery comes into contact with the flexible substrate.

In the above-described game controller, a vibrator accommodated in the housing can be further included, and the vibrator can be arranged on a side of the housing opposite to that of the battery with the internal frame interposed therebetween.

According to this configuration, a vibrator can be arranged at a position corresponding to the battery, and therefore the internal structural body can be made compact overall.

In the above-described game controller, the installation surface can include an inclined surface that extends obliquely with respect to a planar direction extending along the peripheral edge of the opening of the recess, and part of the flexible substrate can be installed so as to cover the inclined surface.

According to this configuration, the installation surface includes an inclined surface that extends obliquely with respect to the surface direction, which extends along the peripheral edge of the opening of the recess. In this manner, the flexible substrate can deform even if an inclined surface that can correspond to various button arrangements is provided on an installation surface, and therefore it is possible to cover both the recess and the inclined surface that is inclined from the recess.

With the game controller according to the present disclosure, it is possible to make the internal structural body more compact.

EMBODIMENTS

Figure 1:
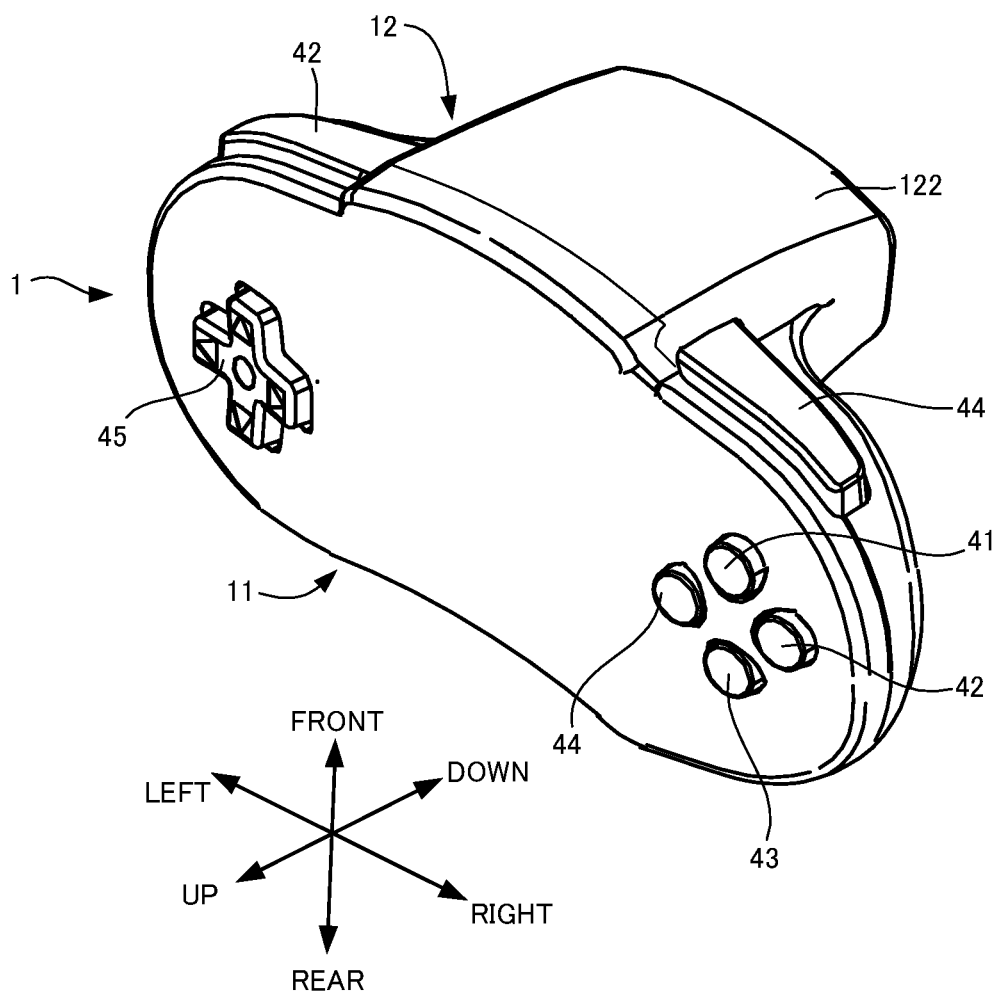
FIG. 1 is a perspective view showing one embodiment of a game controller according to the present disclosure.

Hereinafter, an embodiment of the game controller according to the present disclosure will be described with reference to the drawings. Hereinafter, for the sake of convenience in the description, description will be given in accordance with the directions shown in the drawings. However, there is no limitation to these directions in the production of the game controller according to the present disclosure.

1. Overview of Game Controller

Figure 2:
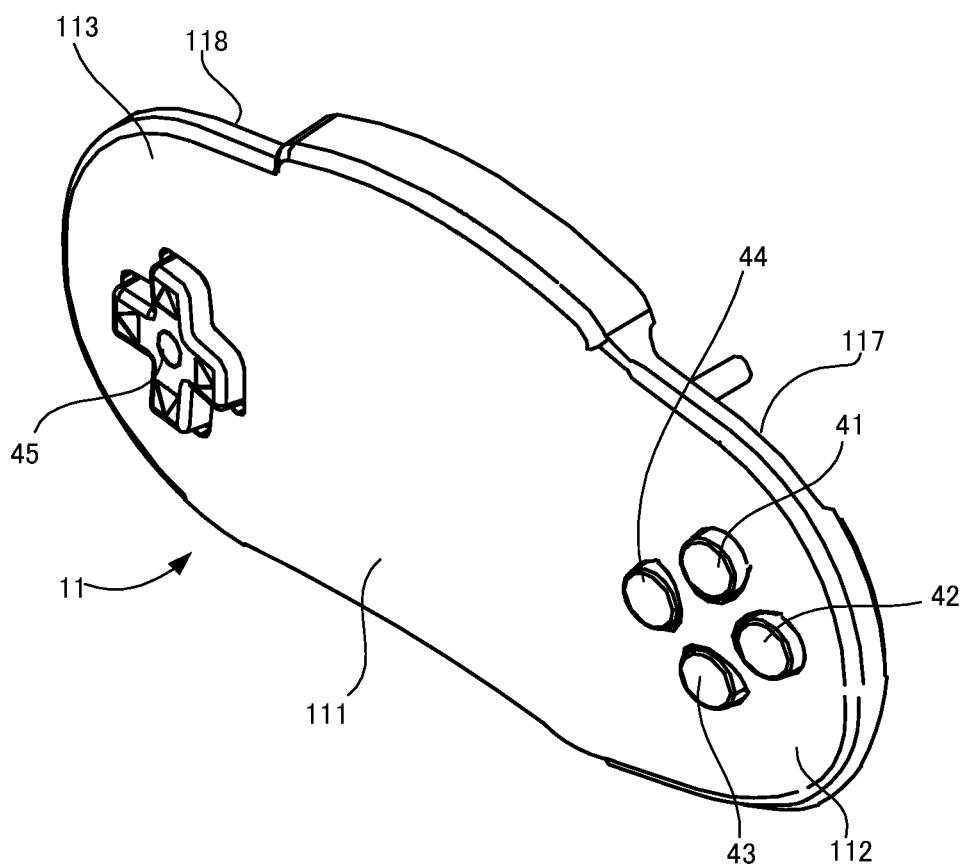
FIG. 2 is a perspective view of an upper cover.
Figure 3:
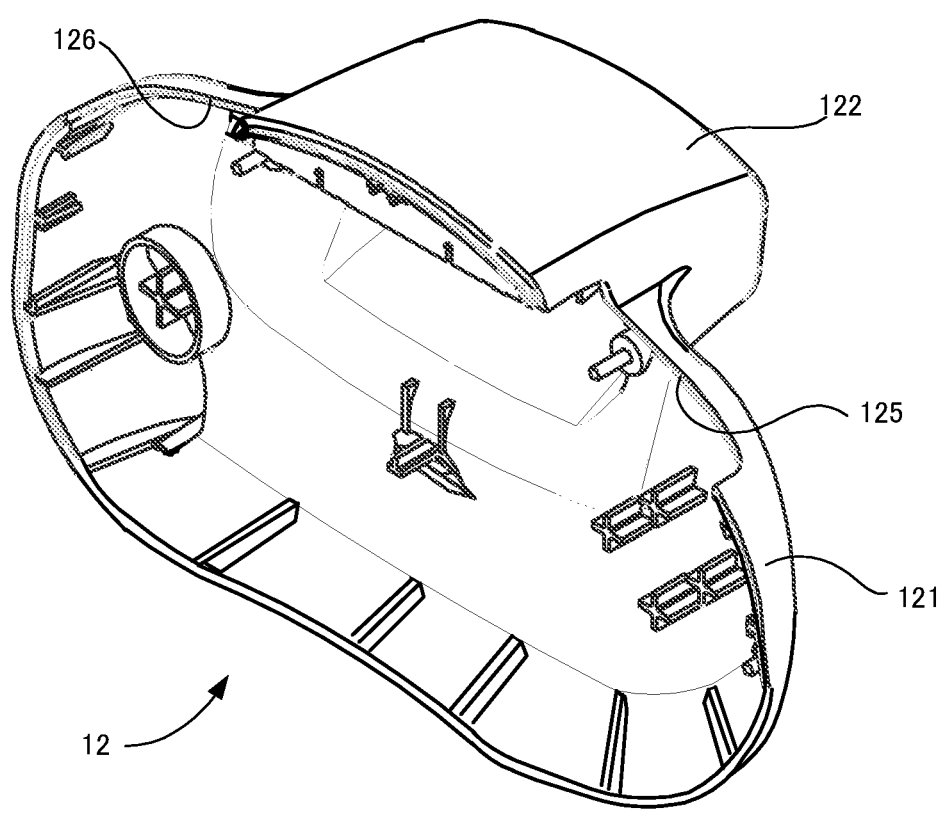
FIG. 3 is a perspective view of a lower cover.
Figure 4:
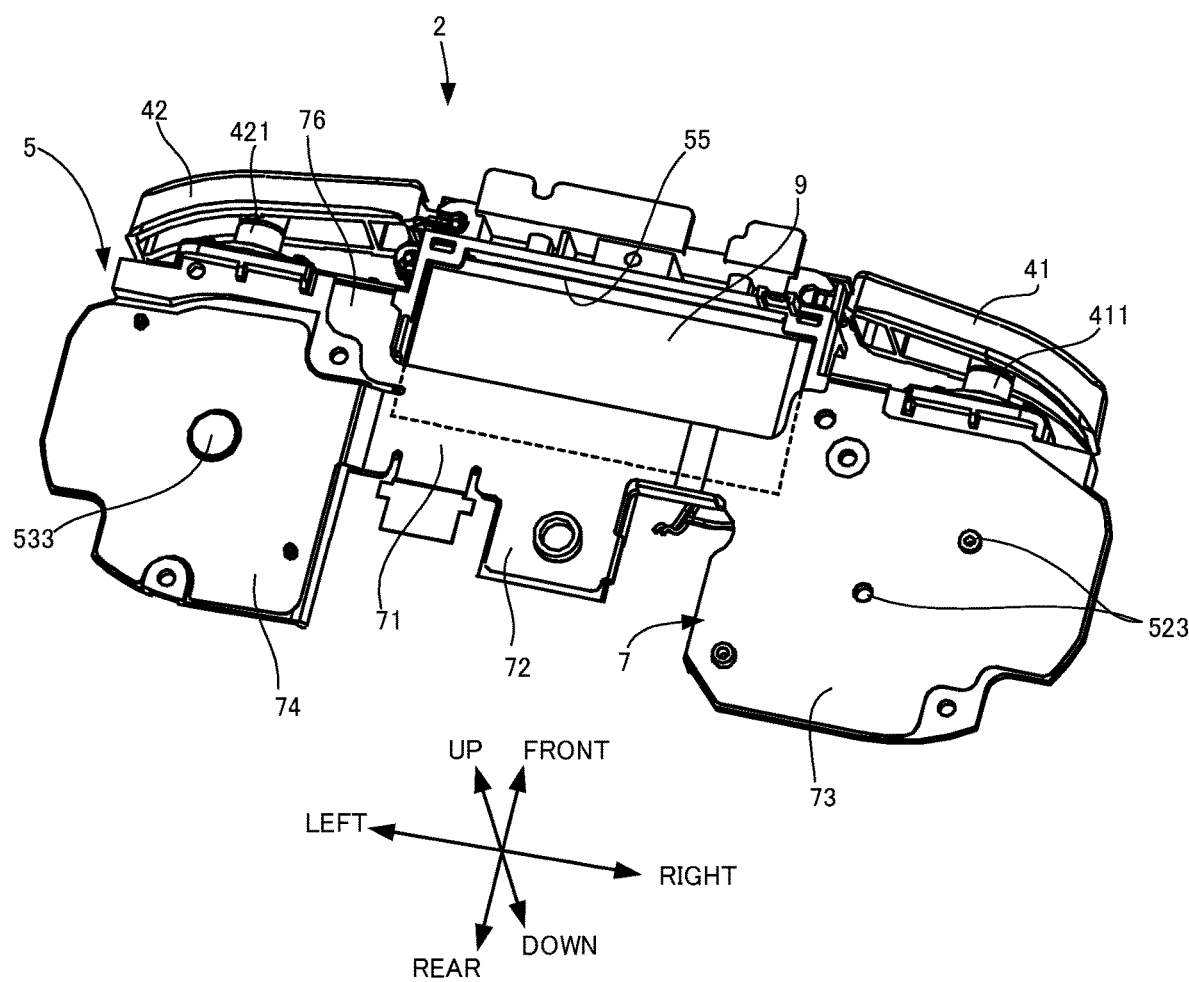
FIG. 4 is a perspective view of an internal structural body.

FIG. 1 is a perspective view of a game controller according to the present embodiment, FIG. 2 is a perspective view of an upper cover, FIG. 3 is a perspective view of a lower cover, and FIG. 4 is a perspective view of an internal structural body. As shown in FIGS. 1 to 4, the game controller according to the present embodiment includes a housing 1 and an internal structural body 2 that is accommodated in the housing 1. Furthermore, a vibrator 31 for providing vibration to the housing 1 is accommodated in the housing 1 (see FIG. 5). The housing 1 is constituted by an upper cover 11 and a lower cover 12, and the internal structural body 2 and the vibrator 31 are accommodated in the internal space surrounded by the upper cover 11 and the lower cover 12. In addition, a main substrate (see FIG. 10), multiple operation buttons 41 to 45, and the like (operation members) are attached to the upper cover 11, and the lower cover 12 is provided with an extended portion 122 accommodating the vibrator 31. Hereinafter, the members will be described in detail.

2. Internal Structural Body

Figure 5:
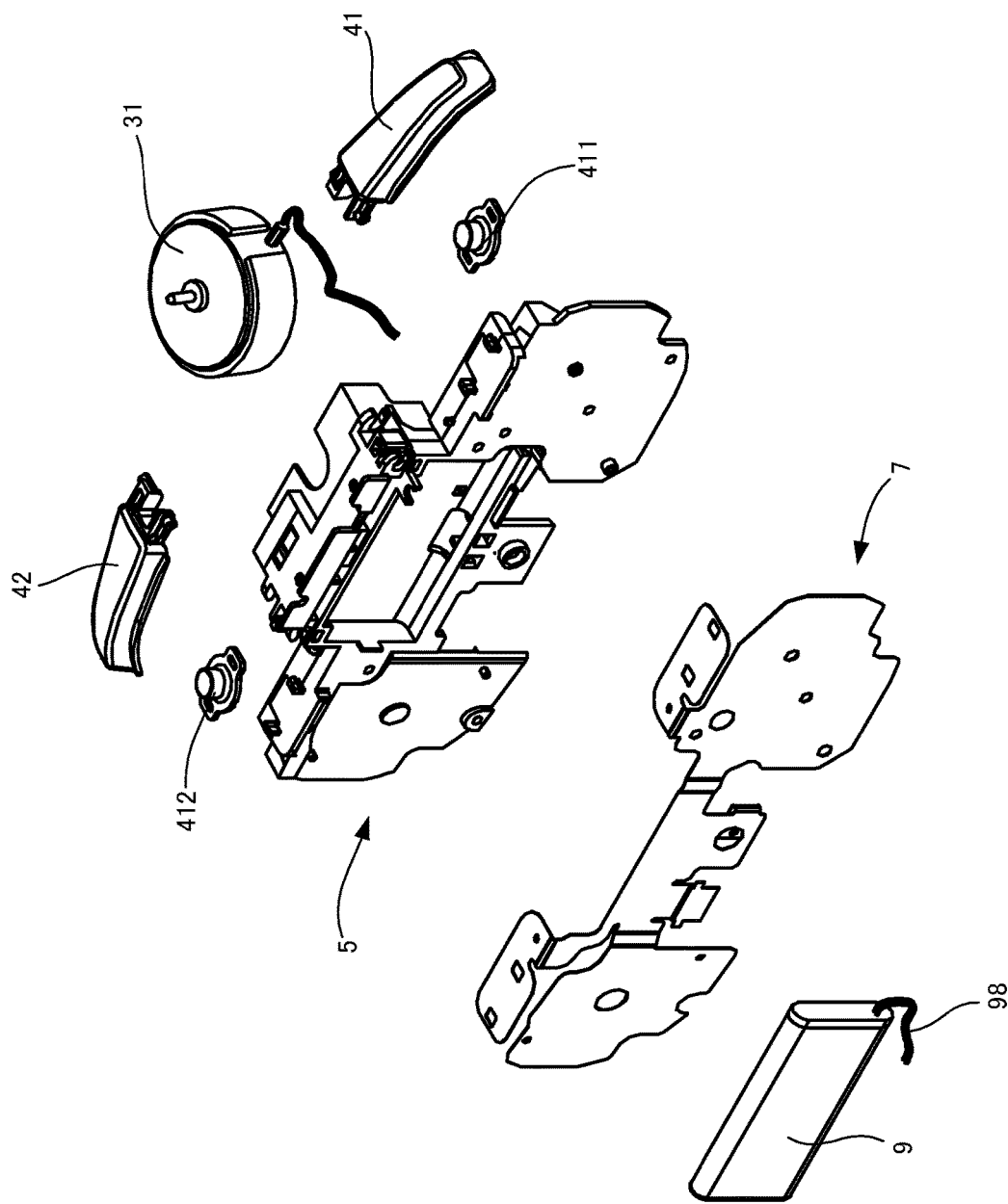
FIG. 5 is an exploded perspective view of an internal structural body.

First, the internal structural body will be described with reference to FIG. 5 as well. FIG. 5 is an exploded perspective view of the internal structural body. As shown in FIGS. 4 and 5, the internal structural body 2 includes an internal frame 5, a flexible substrate 7 that is attached to the internal frame 5, and a battery 9 that is accommodated in the internal frame 5. Also, an R button 41 and an L button 42 are respectively attached to the right end portion and the left end portion of the front portion of the internal frame 5. Furthermore, conductive rubbers 411 and 421 are respectively attached to the R button 41 and the L button 42. Hereinafter, the members will be described. Note that the following is an example of the internal structural body 2, and components and the like other than the members indicated hereinafter can be provided as appropriate.

2-1. Internal Frame

Figure 6:
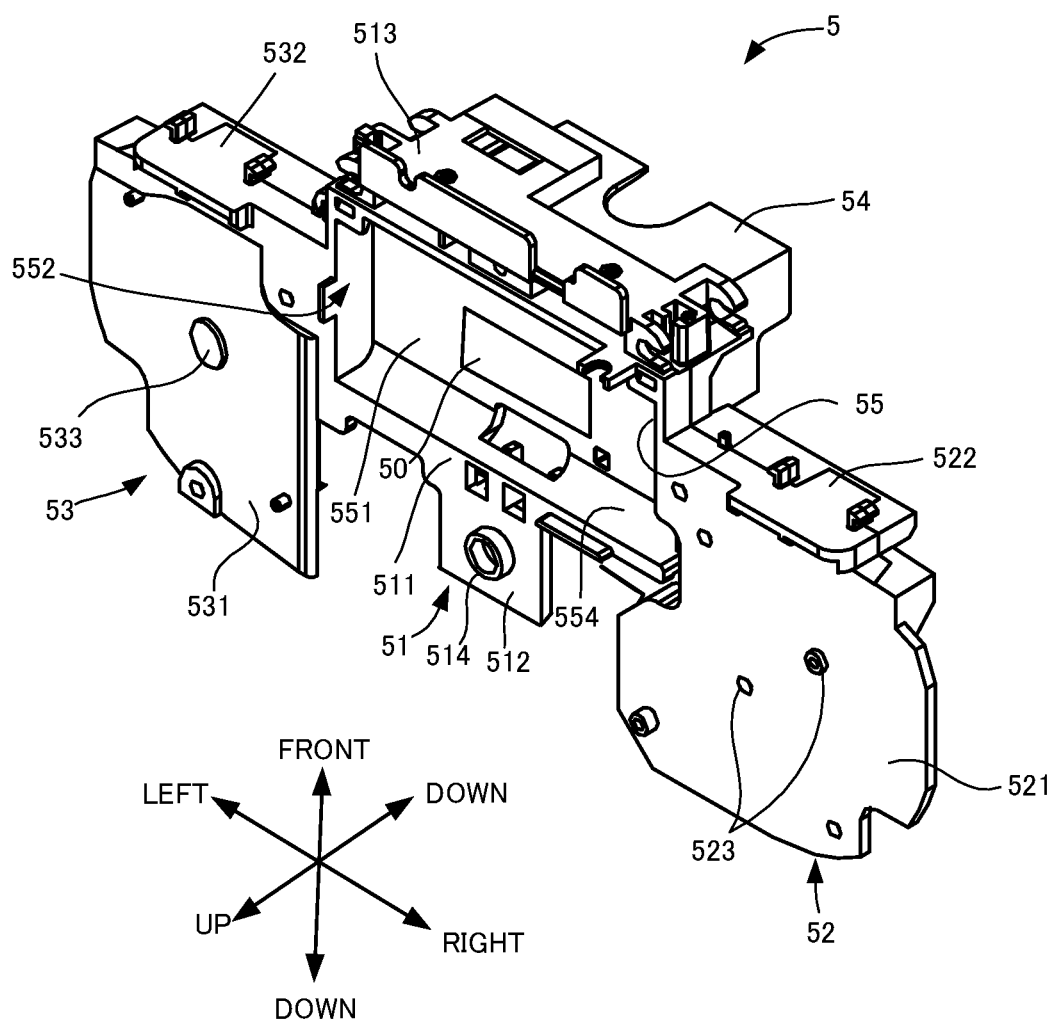
FIG. 6 is a perspective view of an internal frame.
Figure 7:
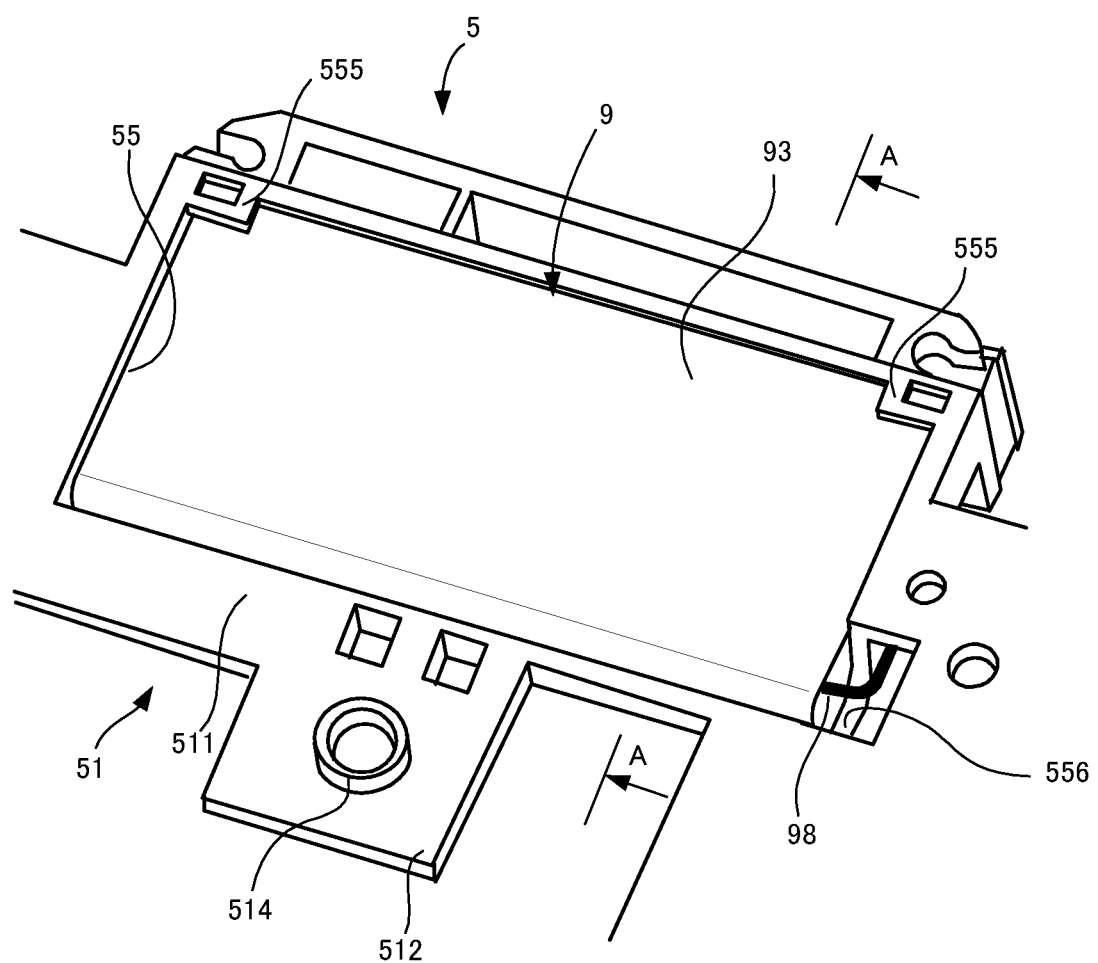
FIG. 7 is a partial perspective view of a perspective view of an internal frame accommodating a battery.
Figure 8:
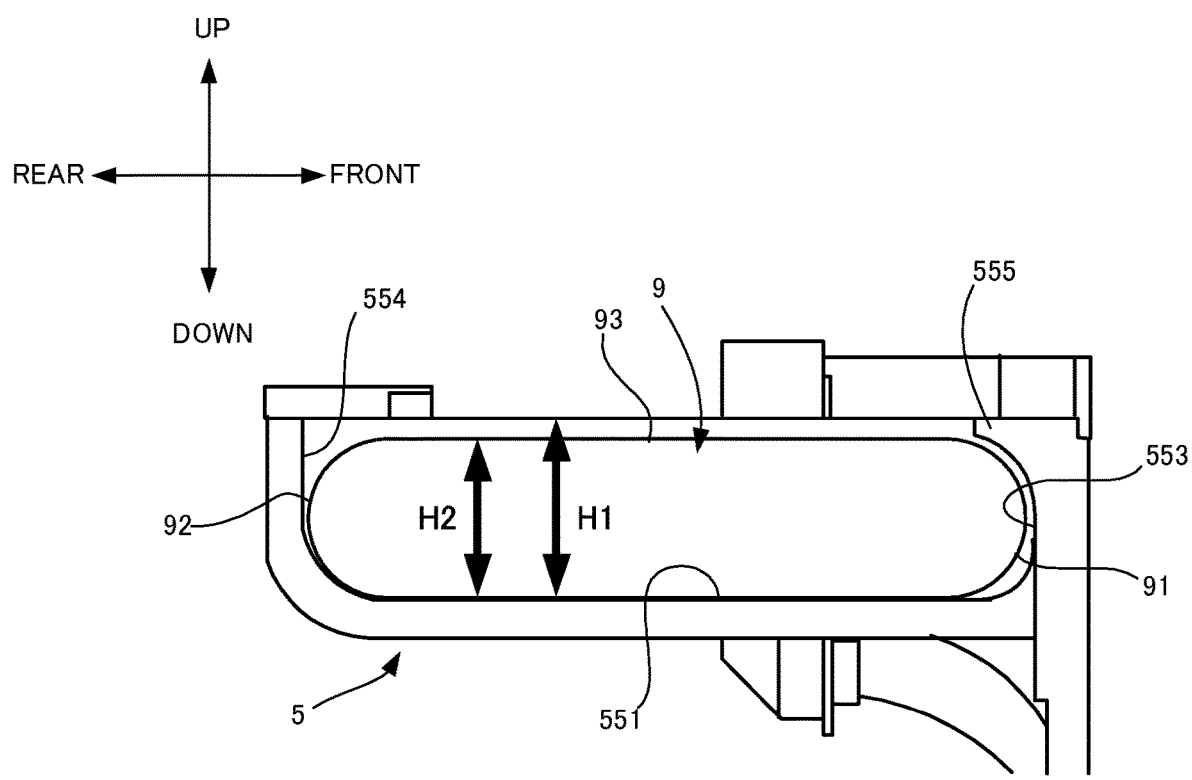
FIG. 8 is a cross-sectional view taken along line A-A in FIG. 7.

Next, an internal frame will be described with reference to FIGS. 6 to 8 as well. FIG. 6 is a perspective view of the internal frame, FIG. 7 is a partial perspective view of the internal frame accommodating a battery, and FIG. 8 is a cross-sectional view taken along line A-A in FIG. 7. As shown in FIGS. 6 and 7, the internal frame 5 includes a center portion 51, a right portion 52 that is arranged on the right side of the center portion 51, and a left portion 53 that is arranged on the left side of the center portion 51, and the flexible substrate 7 is mainly supported by the upper surfaces thereof. Furthermore, a support portion 54 that supports the vibrator 31 is provided on the lower surface side of the center portion 51. The center portion 51 includes an accommodating portion 511 that is rectangular in a plan view, and a protruding portion 512 that is rectangular in a plan view and protrudes from the rear end of the accommodating portion 511. A rectangular recess 55 is formed spanning over approximately the entirety on the upper surface of the accommodating portion 511, and a battery 9 with a flat shape is accommodated in the recess 55. The battery 9 is formed into an approximate cuboid shape, and has a front end surface 91 and a rear end surface 92 that are formed into circular arc shapes in cross section so as to protrude toward the outside. Also, as shown in FIG. 5, a cable 98 for connecting to a later-described main substrate 32 is provided on the right-side surface of the battery 9.

As shown in FIGS. 6 to 8, the recess 55 is constituted by a rectangular flat bottom wall portion (bottom surface) 551 and a side wall portion 552 that stands upright from the peripheral edge of the bottom wall portion 551. The joining portions at which the front-side surface 553 and the bottom wall surface 551 are joined in the four surfaces forming the side wall portion 552 are formed into circular arc shapes in cross section so as to correspond to the front end surface 91 of the battery 9. Similarly, the joining portions at which the rear-side surface 554 and the bottom wall portion 551 are joined in the side wall portion 552 are formed into circular arc shapes in cross section so as to correspond to the rear end surface 92 of the battery 9.

Also, rectangular retaining portions (restricting members) 555 are provided on the side wall portion 552 so as to cover the vicinities of the left and right corner portions on the front side of the recess 55. The retaining portions 555 are formed into plate shapes and the upper surfaces thereof are level with the upper surface of the accommodating portion 511. Also, the front end portion of the battery 9 is accommodated in the gap between the retaining portions 555 and the bottom wall portion 551.

The length in the front-rear direction and the length in the left-right direction of the recess 55 are respectively formed slightly greater than the length in the front-rear direction and the length in the left-right direction of the battery 9, and when the battery 9 is accommodated in the recess 55, a small clearance is formed between the battery 9 and the side wall portion 552 (e.g., within 1 mm). On the other hand, as shown in FIG. 8, the height of the battery 9 is approximately the same as the distance between the above-described retaining portion 555 and the bottom wall portion 551. Accordingly, the depth of the recess 55, that is, a height (first height) H1 of the side wall portion 552, is approximately higher than the height of the battery 9 by approximately the thickness of the retaining portions 555. For this reason, when the battery 9 is accommodated in the recess 55, the upper surface 93 of the battery 9 is located slightly below the upper end portion of the side wall portion 552. That is, a height H2 (second height) from the bottom wall portion 551 to the upper surface 93 (second surface) of the accommodated battery 9 is smaller than the height H1 (first height) of the side wall portion 552. Furthermore, as shown in FIG. 6, double-sided tape 50 is arranged on the bottom wall portion 551, and the bottom wall portion 551 and the lower surface (first surface) of the battery 9 are fixed to each other by the double-sided tape 50.

Also, as shown in FIGS. 4 and 6, the R button 41 is attached to the right end portion of the front end surface 513 of the center portion 51. The R button 41 is a button that extends in the left-right direction, and the left end portion thereof is swingably joined to the right end portion of the front end surface 513. On the other hand, the L button 42 is attached to the left end portion of the front end surface 513. The L button 42 is also a button that extends in the left-right direction and the right end portion thereof is swingably joined to the left end portion of the front end surface 513.

The width in the left-right direction of the protruding portion 512 is smaller than the width of the accommodating portion 511, and the protruding portion 512 protrudes rearward from near the center of the rear end of the accommodating portion 511. A circular protrusion 514 is formed on the upper surface of the protruding portion 512, and is used for positioning when attaching the flexible substrate 7 to the internal frame 5.

Next, the right portion 52 will be described. As shown in FIG. 6, the right portion 52 includes a main body portion 521 that is formed into a plate shape that is approximately rectangular in a plan view, and a plate-shaped front surface portion 522 that is joined so as to extend downward from the front end of the main body portion 521. The front end of the main body portion 521 is located slightly rearward relative to the front end surface 513 of the center portion 51, and the rear end of the main body portion 521 is located even further rearward than the rear end of the protruding portion 512. Also, a gap is formed between the main body portion 521 and the protruding portion 512 in the left-right direction. Also, the upper surface (installation surface, first support surface) of the main body portion 521 extends so as to be continuous from the right end portion of the upper surface of the accommodating portion 511, and the two upper surfaces are approximately level. Furthermore, multiple circular protrusions 523 are formed on the upper surface of the main body portion 521, and are used for positioning when attaching the flexible substrate 7 to the internal frame 5.

The front surface portion 522 extends spanning over approximately the entirety in the left-right direction of the front end of the main body portion 521. Since the front surface portion 522 is located rearward with respect to the front end surface 513 of the center portion 51, a level difference is formed between the center portion 51 and the front surface portion 522, and the R button 41 is arranged so as to fill in this level difference. To give a more specific description, as shown in FIG. 4, the R button 41 is attached to the front end surface 522 of the right portion 52 via the conductive rubber 411.

Next, the left portion 53 will be described. As shown in FIG. 6, the left portion 53 includes a main body portion 531 that is formed into a plate shape that is approximately rectangular in a plan view, and a plate-shaped front surface portion 532 that is joined so as to extend downward from the front end of the main body portion 531. The front end of the main body portion 531 is located slightly rearward relative to the front end surface 513 of the center portion 51, and the rear end of the main body portion 531 is located even further rearward than the rear end of the protruding portion 512. Also, a gap is formed between the main body portion 531 and the protruding portion 512 in the left-right direction. Also, the upper surface (installation surface, second support surface) of the main body portion 531 extends so as to be continuous from the left end portion of the upper surface of the accommodating portion 511, but is joined in an oblique manner so as to incline slightly downward as the left side is approached. Furthermore, a circular protrusion 533 is formed on the upper surface of the main body portion 531, and is used for positioning when attaching the flexible substrate 7 to the internal frame 5.

The front surface portion 532 extends spanning over approximately the entirety in the left-right direction of the front end of the main body portion 531. Since the front surface portion 532 is located rearward relative to the front end surface 513 of the center portion 51, a level difference is formed between the accommodating portion 511 and the front surface portion 532, and the L button 42 is arranged so as to fill in the level difference. To give a more specific description, as shown in FIG. 4, the L button 42 is attached to the front end surface 532 of the left portion 53 via the conductive rubber 421.

Next, the support portion 54 will be described. As shown in FIG. 6, a recess that opens downward is formed in the support portion 54, and multiple support plates (not shown) whose lower end portions are formed into circular arc shapes that protrude upward are arranged inside of the recess. Also, a circular column-shaped vibrator 31 is accommodated in the recess. That is, approximately half of the vibrator is accommodated in the recess such that the outer peripheral surface of the vibrator 31 comes into contact with the support plates. Accordingly, approximately half of the vibrator 31 is exposed to the outside from the support portion 54.

Although there is no particular limitation on the configuration of the vibrator 31, for example, it is possible to include a vibration motor and generate predetermined vibration using the vibration motor. For example, it is possible to cause the vibration motor to vibrate at an amplitude and a frequency that correspond to the waveform of an input voltage.

2-2. Flexible Substrate

Figure 9:
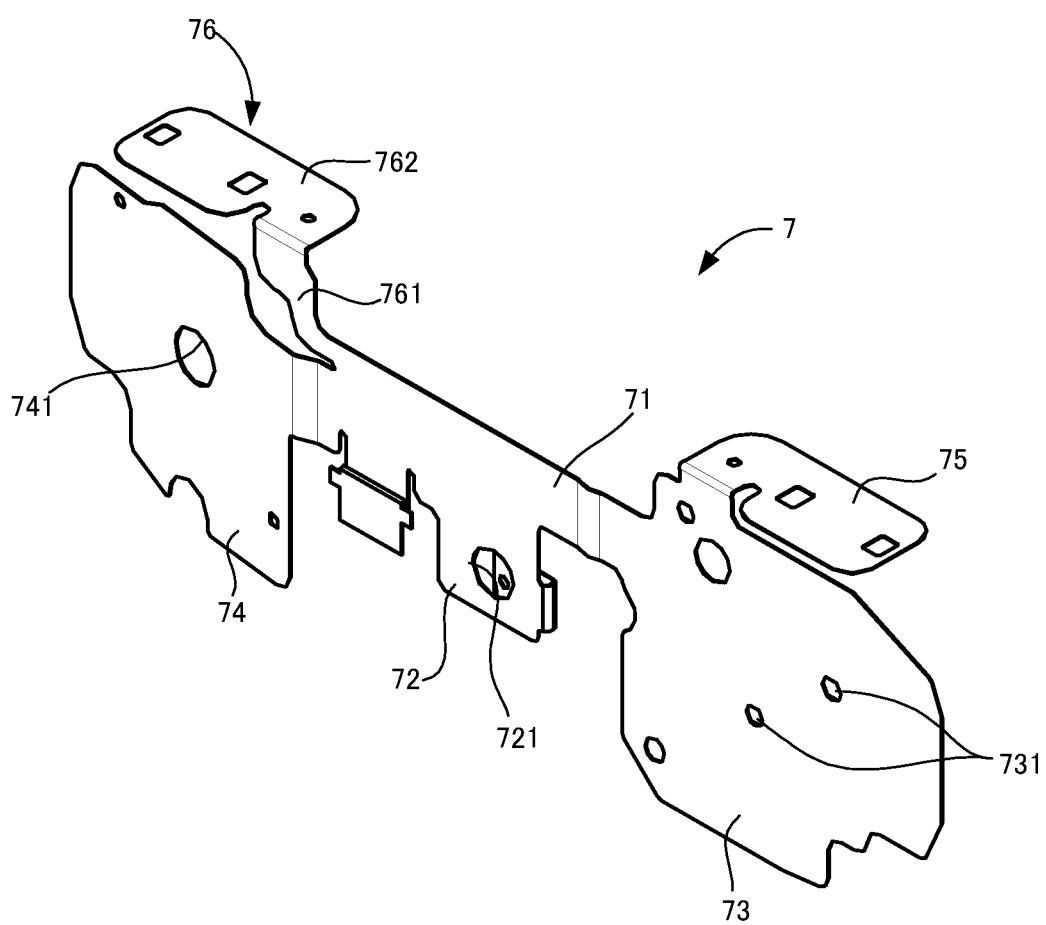
FIG. 9 is a perspective view of a flexible substrate.

Next, the flexible substrate 7 will be described with reference to FIG. 9 as well. FIG. 9 is a perspective view of a flexible substrate. As shown in FIG. 9, the flexible substrate 7 is a known flexible printed circuit board (FPC) obtained by implementing predetermined wiring on a base film, and includes a center portion 71, a rear portion 72, a right portion 73, a left portion 74, a right-front portion 75, and a left-front portion 76, and these portions are formed in one piece. Hereinafter, the portions will be described.

The center portion 71 is a portion that is arranged spanning over the entirety in the left-right direction on the upper surface of the accommodating portion 511 of the internal frame 5, and is formed into a band shape that extends in the left-right direction. To give a more specific description, the center portion 71 is arranged so as to cover the upper surface of the battery 9 accommodated in the recess 55 of the accommodating portion 511. As described above, a gap is formed between the upper surface 93 of the battery 9 and the upper end of the side wall portion 552, and therefore a gap is formed between the center portion 71 and the battery 9 as well. Also, in the present embodiment, as one example, the center portion 71 may be arranged so as to cover the half of the battery 9 that is located rearward with respect to the center of the upper surface 93 thereof instead of covering the entirety of the battery 9. Note that the length in the left-right direction of the center portion 71 is slightly longer than the accommodating portion 511.

The rear portion 72 is a rectangular portion that is joined to the rear end of the center portion 71, and is arranged on the upper surface of the protruding portion 512 of the internal frame 5. A circular through hole 721 is formed on the rear portion 72, and the protrusion 514 of the protruding portion 512 fits therein.

Next, the right portion 73 will be described. The right portion 73 is joined to the right side of the center portion 71 and is arranged on the upper surface of the right portion 52 of the internal frame 5. Multiple through holes 731 are formed in the right portion 73, and the protrusions 523 formed on the upper surface of the right portion 52 are fit therein. Also, multiple contacts (not shown) are arranged on the upper surface of the right portion 73, and these contacts are electrically connected by conductive rubbers 115 (see FIG. 10) for the four operation buttons arranged on the right side of the later-described upper cover 11.

Next, the right-front portion 75 will be described. The right-front portion 75 is a portion that is joined to the front end of the right portion 73, is folded along the joining portion at which the main body portion 521 and the front surface portion 522 of the right portion 52 of the internal frame 5 are joined to each other, and is arranged on the front surface portion 522. A contact (not shown) for the R button 41 is arranged on the right-front portion 75, and the conductive rubber 411 is arranged so as to cover the contact. The conductive rubber 411 is fixed to a protrusion (not shown) formed on the front surface portion 522, and when the conductive rubber 411 is pressed by the R button 41, the conductive rubber 411 causes electrical conduction in the contact of the right-front portion 75.

Next, the left-front portion 76 will be described. The left-front portion 76 is a portion that extends frontward from the left-front end portion of the center portion 71, and includes a first portion 761 that is arranged on the main body portion 531 of the left portion 53 of the internal frame 5, and a second portion 762 that is folded along the joining portion at which the main body portion 531 and the front surface portion 532 are joined, and that is arranged on the front surface portion 532. A contact (not shown) for the L button 42 is arranged on the second portion 762, and the conductive rubber 421 is arranged so as to cover this contact. The conductive rubber 421 is fixed to a protrusion (not shown) formed on the front surface portion 532, and when the conductive rubber 421 is pressed by the L button 42, the conductive rubber 421 causes electrical conduction in the contact of the second portion 762.

Next, the left portion 74 will be described. The left portion 74 is joined to the left side of the center portion 71 and is arranged on the upper surface of the left portion 53 of the internal frame 5. A through hole 741 is formed near the center of the left portion 74, and the protrusion 533 formed on the upper surface of the left portion 53 is fit therein. Also, as described above, the left portion 53 of the internal frame 5 is joined so as to be inclined with respect to the center portion 51, and therefore the left portion 74 is folded slightly obliquely with respect to the center portion 71 and is arranged so as to extend along the upper surface of the left portion 53. Furthermore, multiple contacts (not shown) are arranged on the upper surface of the left portion 74, and these contacts are electrically connected by conductive rubbers 116 (see FIG. 10) for a D-pad 49 arranged on the left side of the later-described upper cover 11.

3. Upper Cover and Main Substrate

Figure 10:
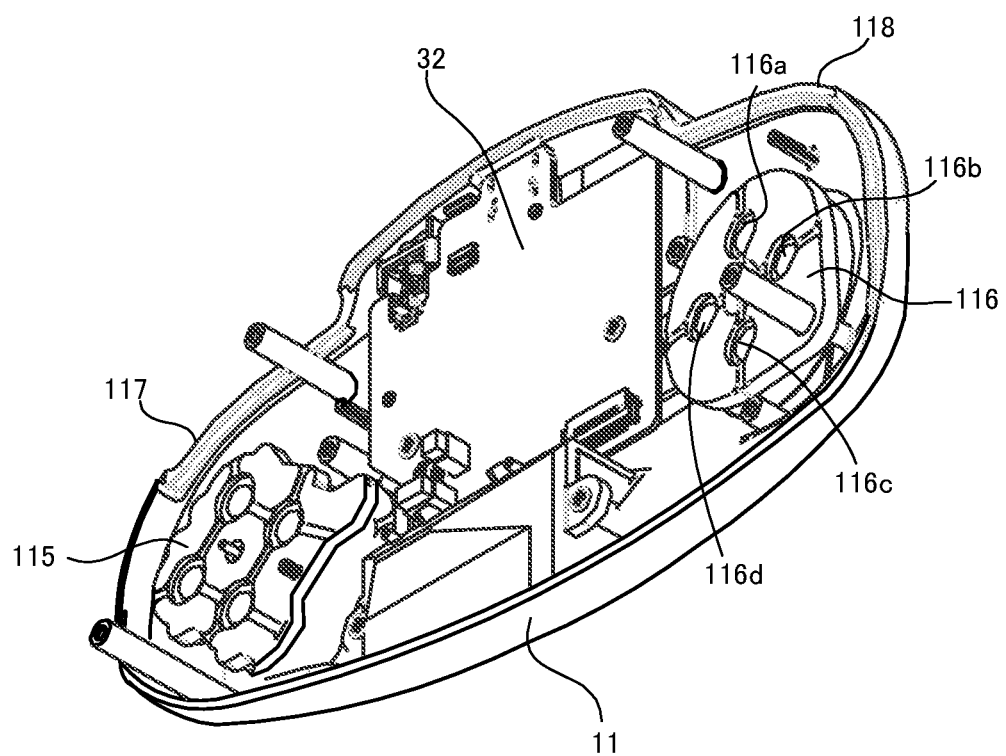
FIG. 10 is a perspective view from below of the upper cover to which a main substrate is attached.
Figure 11:
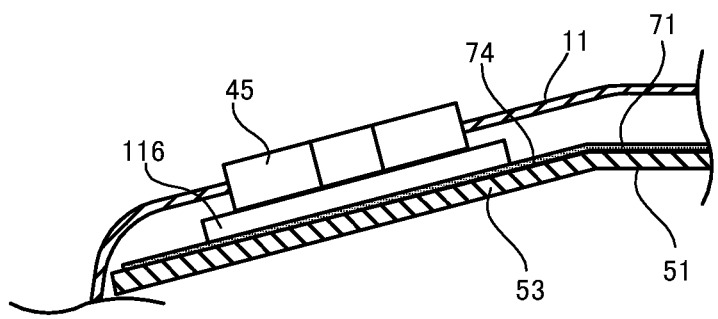
FIG. 11 is a schematic view showing a partial cross-section of a left side of the game controller.

Next, an upper cover will be described with reference to FIGS. 10 and 11 as well. FIG. 10 is a perspective view from below of a main substrate and an upper cover to which the conductive rubber is attached, and FIG. 11 is a schematic view showing a partial cross-section of the left side of the controller. As shown in FIG. 2, the upper cover 11 is formed into a cup shape so as to cover the upper side of the internal structural body 2, and is formed into an oval shape in a plan view that extends in the left-right direction. Four operation buttons 41 to 44 are arranged on the right side of the upper cover 11, and the D-pad 45 is arranged on the left side. The right side of the upper cover 11 is a portion that corresponds to the right portion 73 of the flexible substrate 7, four circular through holes are formed therein, and the operation buttons 41 to 44 are fit into the respective through holes so as to be able to move up and down. Also, the conductive rubbers 115 that are accommodated inside of the upper cover 11 are attached to the lower end portions of the operation buttons 41 to 44, and when the operation buttons 41 to 44 are pressed, as described above, the conductive rubbers 115 cause electrical conduction in the contacts of the right portion 73 of the flexible substrate 7.

As shown in FIG. 11, the left side of the upper cover 11 is a portion corresponding to the left portion 74 of the flexible substrate 7, and is formed so as to extend slightly obliquely from near the center. Accordingly, the left side portion 113 of the upper cover 11 and the left portion 74 of the flexible substrate 7 are approximately parallel to each other. A cross-shaped through hole is formed on the left-side portion 113, and the D-pad 45 is fit into this through hole. Accordingly, the D-pad 45 is also arranged approximately parallel to the left portion 74 of the flexible substrate 7. Note that in FIG. 11, the inclinations of the upper cover 11 and the like are illustrated in an exaggerated manner in order to facilitate comprehension.

The D-pad 45 is configured such that its four end portions swing with respect to the center, and a conductive rubber 116 having conductive portions 116a to 116d is attached to the lower end portions of the end portions. Also, when any end portion of the D-pad 45 is pressed in, as described above, the conductive portions 116a to 116d cause electrical conduction in the contacts of the left portion 74. Note that electrical conduction can also be caused in two contacts at the same time by pressing any two adjacent end portions among the four end portions of the D-pad 45 at the same time.

Notches 117 and 118 are formed on both sides of the front end of the upper cover 11, and these notches 117 and 118 are combined with notches 125 and 126 in the later-described lower cover 12 to form through holes. Also, the R button 41 and the L button 42 are exposed from these through holes.

As shown in FIG. 10, the main substrate 32 is fixed to the lower surface near the center of the upper cover 11. The main substrate 32 is constituted by a hard printed circuit board, and is equipped with electrical components such as an operation control circuit, a communication module, an NFC circuit, a power source control circuit, and multiple terminals, which are not shown in the drawings. When various operation buttons and the like are pressed, the operation control circuit generates operation data corresponding thereto. The thus-generated operation data is transmitted to a game device main body by the communication module. The NFC circuit performs near-field wireless communication based on the NFC standard, and performs transmission and reception of operation data and the like through wireless communication between the game controller and the game device main body. The power source control circuit performs drive control of the battery. Furthermore, cables (not shown) that respectively extend from the battery 9, the flexible substrate 7, and the vibrator 31 are connected to the terminals of the main substrate 32. Note that when the internal structural body 2 is attached to the upper cover 11, a gap is formed between the main substrate 32 and the flexible substrate 7, and the main substrate 32 and the flexible substrate 7 are prevented from coming into contact with each other.

4. Lower Cover

As shown in FIG. 3, the lower cover 12 is formed so as to cover the lower side of the internal structural body 2, and includes a cup-shaped cover main body 121 that extends in the left-right direction and is formed into an oval shape in plan view so as to correspond to the upper cover 11, and an extended portion 122 that extends downward from near the center of the front end of the cover main body 121, and these portions are formed in one piece. The extended portion 122 accommodates the support portion 54 and the vibrator 31 of the internal frame 5, and is formed into a cuboid shape.

Notches 125 and 126 are formed on both sides of the extended portion 122 in the cover main body 121, and as described above, are combined with the notches 117 and 118 of the upper cover 11 to form the through holes.

5. Method for Assembling Game Controller

Figure 12:
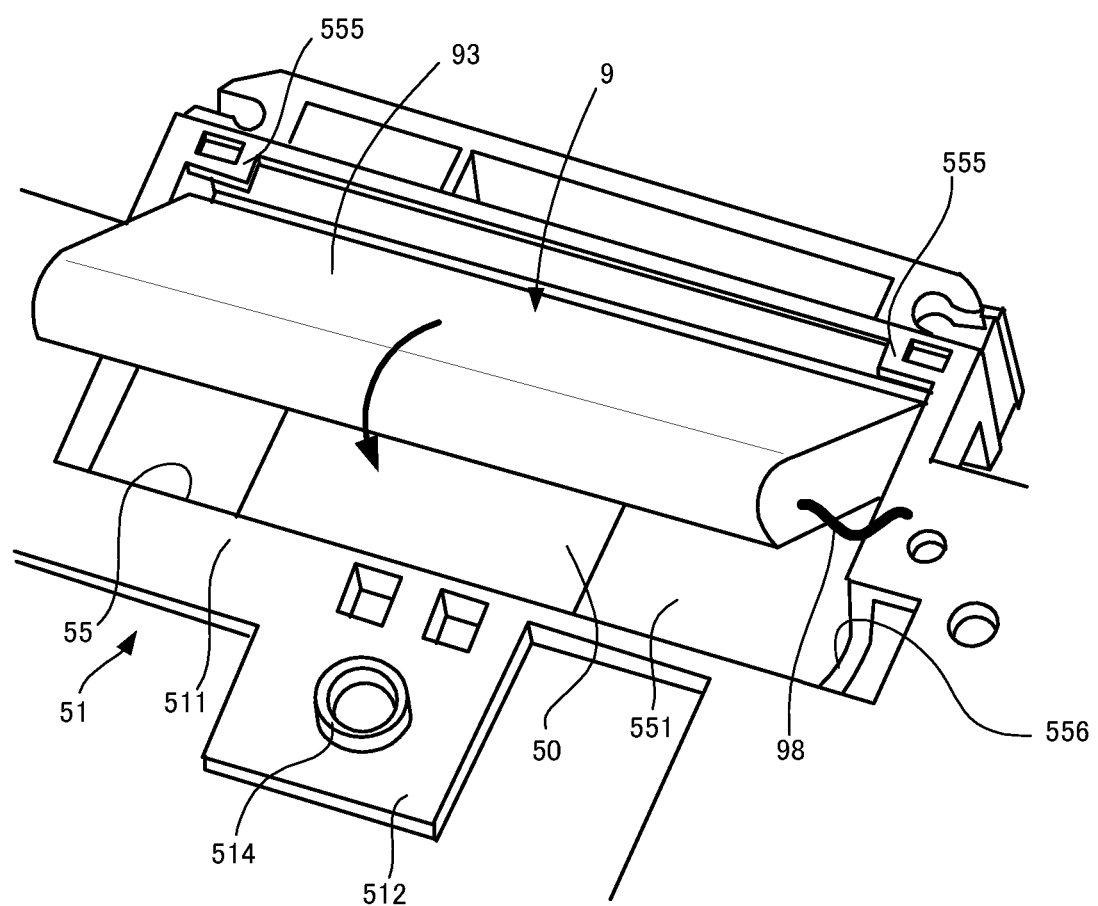
FIG. 12 is a perspective view showing assembly of the game controller.
Figure 13:
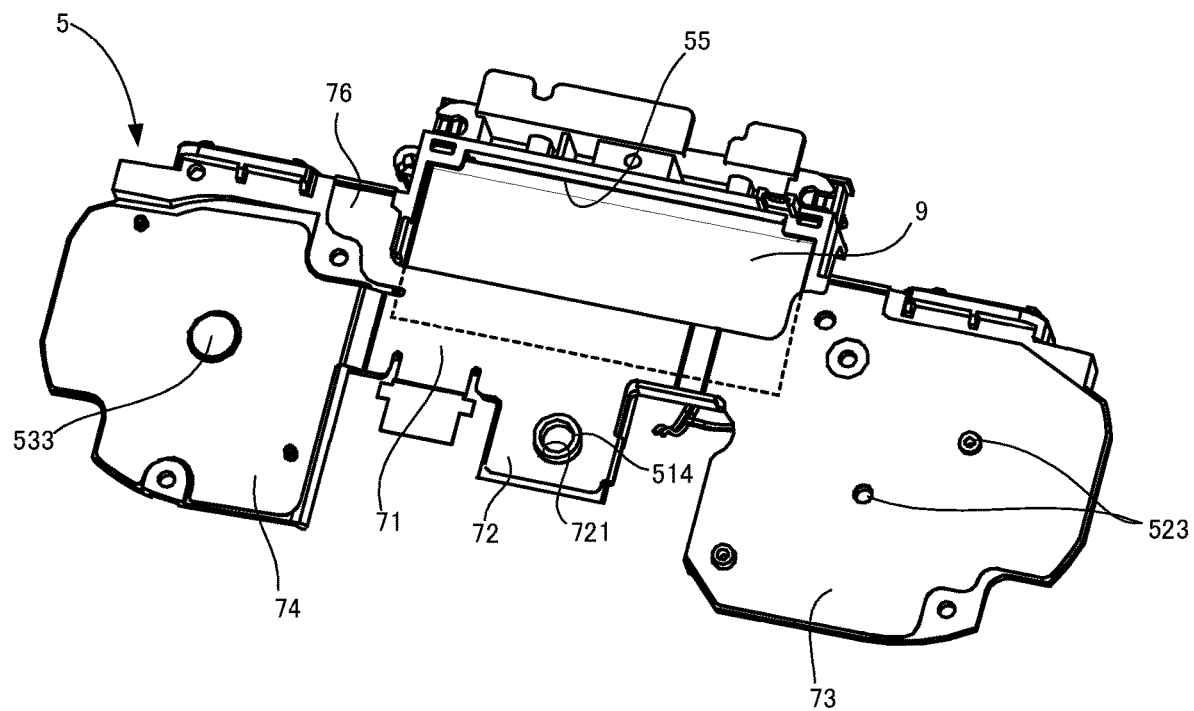
FIG. 13 is a perspective view showing assembly of the game controller.

Next, an example of a method for assembling the components relating to the present disclosure in the game controller constituted as described above will be described with reference to FIGS. 12 and 13 as well. FIGS. 12 and 13 are perspective views for illustrating assembly of the game controller.

First, as shown in FIG. 6, the double-sided tape 61 is fixed to the recess 55 of the accommodating portion 511 of the internal frame 5. Next, the battery 9 is accommodated in the recess 55. First, as shown in FIG. 12, the front end surface 91 of the battery 9 is inserted between the bottom wall portion 551 and the retaining portions 555 of the recess 55 in a state in which the front end surface 91 is inclined downward toward the internal frame 5. In this state, the rear portion of the battery 9 is pivoted downward centered about the front end surface 91 of the battery 9 and the battery 9 is accommodated in the recess 55. The cable 98 of the battery 9 is passed through a groove 556 formed on the right side of the recess 55, and is pulled upward from the gap between the protruding portion 512 and the right portion 52 via the lower surface of the internal frame 5 from the groove 556. In this manner, the lower surface of the battery 9 is fixed to the bottom wall portion 551 of the recessed portion 55 by the double-sided tape 50.

Next, as shown in FIG. 13, the flexible substrate 7 is fixed to the internal frame 5 by multiple pieces of double-sided tape (not shown). First, the protrusion 514 of the protruding portion 512 is fit into the through hole 721 of the rear portion 72, and the rear portion 72 is fixed to the upper surface of the protruding portion 512 with double-sided tape. Accordingly, the center portion 71 is arranged so as to cover the rear portion of the battery 9. Next, the protrusion 523 of the right portion 52 is fit into the through hole 731 of the right portion 73 and the right portion 73 is fixed to the upper surface of the right portion 52 with double-sided tape. Next, the right-front portion 75 is fixed to the front surface portion 522 of the right portion 52 with double-sided tape. After this, the protrusion 533 of the left portion 53 is fit into the through hole of the left portion 74, and the left portion 74 is fixed to the upper surface of the left portion 53 with double-sided tape. Finally, the left front portion 76 is fixed to the front surface portion 532 of the left portion 53 with double-sided tape.

In this manner, the flexible substrate 7 is fixed to the internal frame 5. Here, as described above, the length in the left-right direction of the center portion 71 is slightly longer than the accommodating portion 511. Also, the length between the through holes 731 and 741 of the flexible substrate 7 positioned there is longer compared to the length between the protrusions 523 and 533 for positioning, which are provided at the left and right portions on both sides of the accommodating portion 511. Accordingly, when the right portion 73 and the left portion 74 are fixed to the internal frame 5, the center portion 71 is fixed therebetween not in a state in which a tensile force is acting, but in a slightly bent state.

Next, as shown in FIG. 4, the conductive rubber 411 is attached to the right front portion 75 and the R button 41 is attached to the internal frame 5. Similarly, the conductive rubber 421 is attached to the left front portion 76 and the L button 42 is attached to the internal frame 5. Also, the vibrator 31 is fixed to the recess of the support portion 54 via a cushion member (not shown).

Next, as shown in FIG. 2, the main substrate 32 is fixed to the upper cover 11, and the four operation buttons 41 to 44 and the D-pad 45 are attached together with the conductive rubbers 115 and 116. Thereafter, the cable 98 of the battery 9, the cable of the vibrator 31, and the cable of the flexible substrate 7 are respectively connected to the terminals of the main substrate 32. Finally, the upper cover 11 and the lower cover 12 are fixed to each other with screws in a state in which the internal structural body 2 is interposed between the upper cover 11 and the lower cover 12. In this manner, as shown in FIG. 1, the assembly of the game controller is complete.

6. Features

According to the game controller according to the present embodiment, it is possible to exhibit the following effects.

(1) Since the recess 55, which can accommodate the battery 9, is formed in the internal frame 5, the region in which the battery 9 is arranged need not be provided separately in the internal structural body 2, and therefore the internal structural body 2 can be made compact. Also, although the flexible substrate 7 is arranged so as to cover part of the upper surface of the battery 9, the main flexible substrate 7 has a generally thin sheet-shape, and therefore the bulk does not increase even if the main flexible substrate 7 is arranged so as to overlap with the battery 9. Accordingly, this also contributes to making the internal structural body 2 compact. Furthermore, the flexible substrate 7 functions also as a lid that covers the battery 9.

Figure 14:
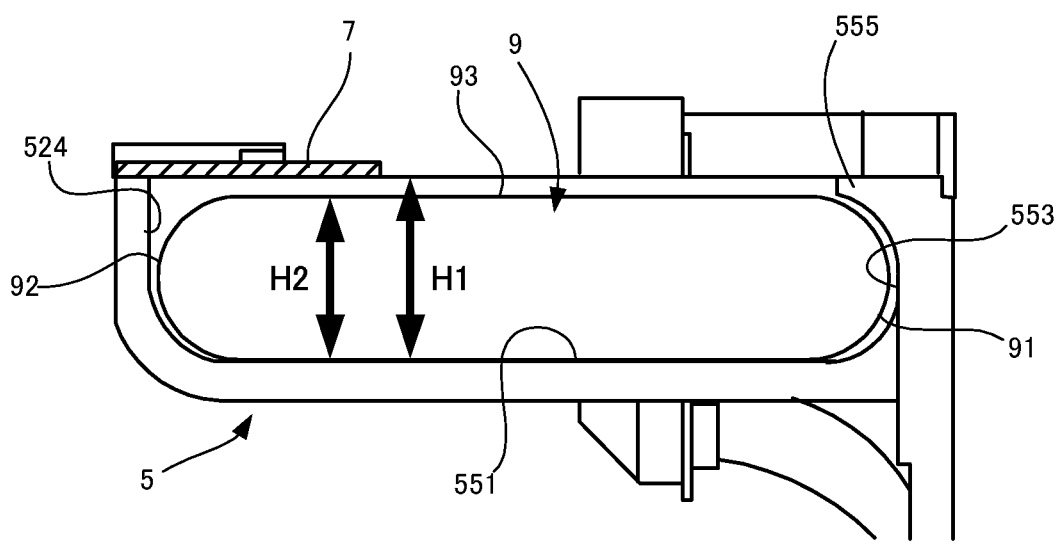
FIG. 14 is a cross-sectional view illustrating the relationship between heights of a recess and the battery.

(2) As shown in FIG. 14, the height H1 from the bottom wall portion 551 of the recessed portion 55 to the upper end of the side wall portion 552 is greater than the height H2 from the upper surface 93 of the battery 9 accommodated in the recess 55 to the bottom wall portion 551, and therefore a gap is formed between the battery 9 and the flexible substrate 7, and it is possible to suppress a case in which the battery 9 and the flexible substrate 7 come into contact with each other. On the other hand, for example, even if the battery 9 swells, the swelling of the battery 9 can be absorbed by the above-described gap. Accordingly, for example, it is possible to suppress a case in which the flexible substrate 7 is pressed by the swollen battery 9.

(3) Since the flexible substrate 7 covers part of the battery 9, when the battery 9 swells, the number of locations at which the swollen battery 9 and the flexible substrate 7 come into contact with each other can be reduced. That is, it is possible to reduce the likelihood of contact between the battery 9 and the flexible substrate 7.

(4) When the battery 9 swells, there is a possibility that the central portion thereof will swell the most. In contrast to this, in the present embodiment, the flexible substrate 7 is arranged so as to cover the rear portion of the upper surface 93 of the battery 9 and not to cover the periphery of the center, and therefore it is possible to further suppress the likelihood of contact between the battery 9 and the flexible substrate 7. That is, from this perspective, the flexible substrate 7 preferably covers only the portion lower than the center of the upper surface 93 of the battery 9. Note that, for example, the vicinity of the center of the upper surface 93 of the battery 9 can be a region including the intersection point of diagonal lines formed virtually with respect to the four corners of the battery 9 (corresponds to the center of the second surface of the battery according to the present disclosure).

(5) The internal frame 5 includes the right portion 52 and the left portion 53 between which the recess 55 is interposed. Here, the flexible substrate 7 can be arranged so as to extend from the right portion 52, through the recess 55, and to the left portion 53. That is, the right portion 52 and the left portion 53 on which the operation buttons 41 to 44 and the D-pad 45 are respectively arranged are covered by one flexible substrate 7, and the flexible substrate 7 is further folded and arranged so as to cover the front surface portions 522 and 532. Accordingly, the degree of freedom in the design of the internal structural body 2 can be increased. Also, using one flexible substrate 7 contributes to reducing the cost as well.

(6) Since the retaining portion 555 that engages with the battery 9 is provided at the corner portion on the front side of the recess 55, for example, it is possible to accommodate the battery 9 in the recess 55 by inserting the battery 9 so as to engage with the retaining portions 555 from the rear side at which the retaining portions 555 are not provided. Accordingly, the accommodation of the battery 9 is easy. On the other hand, the rear side on which the retaining portions 555 are not provided is covered by the flexible substrate 7, and therefore on the rear side of the recess 55, it is possible to suppress the battery 9 from coming out using the flexible substrate 7.

(7) When the flexible substrate 7 is fixed to the internal frame 5, the center portion 71 covering the recess 55 is provided with a flexure portion. For this reason, for example, when the battery 9 swells, it is possible to suppress tensile stress from acting on the flexible substrate 7 even if the battery 9 comes into contact with the flexible substrate 7.

(8) The left portion 53 of the internal frame 5 is joined so as to extend obliquely with respect to the center portion 51, and the left side of the upper cover 11 also inclines so as to correspond thereto. For this reason, the D-pad 45 can be arranged so as to be inclined, and therefore the D-pad 45 is more easily pressed by a finger on the left hand gripping the left side of the housing 1. Accordingly, even if an inclined surface that can correspond to this kind of button arrangement is provided on the internal frame 5, the flexible substrate 7 can deform, and therefore both the accommodating portion 511 in which the recess 55 is formed and the left portion 53 that is inclined from the accommodating portion 511 can be covered.

7. Variations

Although an embodiment of the present disclosure was described above, the present disclosure is not limited to the above-described embodiment, and various modifications are possible without departing from the gist of the disclosure. For example, the following modifications are possible. Also, the following variations can be combined as appropriate.

(1) The shape of the housing 1, the shape of the internal frame 5, the shape of the flexible substrate 7, the shape of the recess 55, and the shape of the battery 9 in the above-described embodiment are exemplary, and can be modified in various ways. For example, multiple gripping portions for a user to grip can also be provided separately in the housing 1. Also, for example, the planar shapes of the battery 9 and the recess 55 need not be rectangular, and may be other shapes. Also, in the above-described embodiment, the front end surface 91 and the rear end surface 92 of the battery 9 are formed into circular arc shapes, but they may also be flat surfaces, and the shapes of the side surfaces can also be changed as appropriate. Accordingly, the shape of the recess 55 in which the battery 9 is accommodated can also be changed as appropriate according to the shape of the battery 9.

(2) There is no particular limitation on the position and number of the retaining portions 555, and the retaining portions 555 can also be provided at locations other than the front end portion of the recess 55. In the above-described embodiment, the depth of the recess 55 is greater than the height of the battery 9 by the thickness of the retaining portion 555, but there is no limitation to this, and the above-described difference between the height H1 and the height H2 and the thickness of the retaining portion 555 need not match each other, and the thickness of the retaining portion 555 may also be smaller than this difference. However, the retaining portion 555 is preferably provided on the side opposite to the portion of the recess 55 covered by the flexible substrate 7. Also, the retaining portion 555 is not essential, and need only be provided according to need.

Furthermore, although the retaining portion 555 is a restriction member for restricting the battery 9 from coming out of the recess 55, judging from this kind of object, there is no particular limitation on the shape and position thereof as long as it is a member in which a gap in which part of the battery 9 is arranged is provided between the member and the bottom surface 551 of the recess 55. Accordingly, for example, part of the wall surface forming the recess 55 can form a restriction member, and the restriction member can also be provided so as to extend from the outside of the recess 55 to the interior of the recess 55 and straddle part of the recess 55.

(3) The flexible substrate 7 is arranged so as to cover the rear side of the battery 9 accommodated in the recess 55, but depending on the arrangement of the flexible substrate 7, the flexible substrate 7 may also cover another portion of the upper surface of the battery 9. Alternatively, the surface area by which the battery 9 is covered may also be increased, and for example, the entire upper surface 93 of the battery 9 may also be covered. However, giving consideration to the possibility of contact with the swollen battery 9, it is preferable that the flexible substrate 7 covers part of the upper surface 93 of the battery 9.

(4) The internal frame 5 includes the center portion 51 in which the recess 55 is formed, and the right portion 52 and the left portion 53 on which the flexible substrate 7 is arranged on both sides of the center portion 51, but the shape of the internal frame 5 is not limited thereto. That is, the portions other than the center portion 51 can be modified as appropriate according to the type, number, and the like of the operation buttons and the like. However, the center portion 51 need only be provided with the accommodating portion 511 that includes at least a recess, and the protruding portion 512 is not necessarily needed. Accordingly, the numbers, positions, shapes, and the like of the portions other than the center portion 51 of the internal frame 5 can be modified as appropriate. For example, the number of the portions other than the center portion 51 on which the flexible substrate 7 is arranged can be 1, or 3 or more. Accordingly, according to the form of the internal frame 5, for example, the flexible substrate 7 also need only be provided with at least the center portion 71 and a portion corresponding to a portion other than the center portion 51 of the internal frame 5.

(5) In the above-described embodiment, the main substrate 32 is provided in addition to the flexible substrate 7, but it is sufficient that at least the flexible substrate 7 is provided, and the other substrate need only be provided according to need.

(6) There is no particular limitation on the position at which the vibrator 31 is provided, and the vibrator 31 can also be provided at a position other than a position corresponding to the battery 9 in the internal frame 5. Also, the vibrator 31 is not essential and need only be provided according to need. Accordingly, the support portion 54 can also be omitted as long as the vibrator 31 is not provided.

(7) The operation buttons 41 to 44, the D-pad 45, the R button 41, and the L button 42 are examples of operation members, and the types, numbers, and positions thereof can be changed as appropriate.

(8) In the above-described embodiment, the lower surface of the battery 9 is in contact with the bottom wall portion 551 of the recess 55, and the height H2 from the bottom wall portion 551 to the upper surface of the battery 9 is smaller than the depth H1 of the recess. That is, in the above-described embodiment, the distance between the upper surface and the lower surface of the battery 9 (the height of the battery 9) matches H2, but for example, a member such as a leg portion may also be arranged on the lower surface of the battery 9. In this case, the height of the battery 9 and H2 do not match each other, but in the present disclosure, it is sufficient that the height H2 from the bottom wall portion 551 to the upper surface of the battery 9 is smaller than the depth H1 of the recess.

(9) In the above-described embodiment, the flexible substrate 7 is arranged on the internal frame 5, but it is also possible to use a substrate formed into a hard plate shape instead of this kind of flexible substrate in the form of a film. Even with this kind of substrate, the thickness is generally small, and therefore the volume of the internal structural body 2 does not increase even if such a substrate is arranged so as to cover the battery 9. Also, as long as the above-described relationship between the heights of the battery 9 and the recess 55 is satisfied, even if a hard substrate is used, the battery 9 is suppressed from coming into contact therewith when it is swollen.

LIST OF REFERENCE NUMERALS

1 Housing
2 Internal structural body
5 Internal frame
7 Flexible substrate
9 Battery
31 Vibrator
55 Recess
555 Retaining portion (restriction member)
H1 First height
H2 Second height

What is claimed is:
1. A game controller comprising:
a housing; and
an internal structural body accommodated inside of the housing,
wherein the internal structural body includes at least:
an internal frame having an installation surface and a recess adjacent to the installation surface;
a battery that is accommodated in the recess of the internal frame and has a first surface that opposes a bottom surface of the recess and a second surface on a side opposite to the first surface; and
a flexible substrate that is installed on the installation surface of the internal frame and includes a conductive pattern,
the flexible substrate is installed so as to cover at least part of the second surface of the battery accommodated in the recess, and
a first height, which is a height from the bottom surface of the recess to the installation surface, is greater than a second height, which is a height from the bottom surface to the second surface when the battery is accommodated in the recess.

2. The game controller according to claim 1, wherein the flexible substrate is configured to cover only part of the second surface of the battery.

3. The game controller according to claim 2, wherein the flexible substrate is configured not to cover the center of the second surface of the battery.

4. The game controller according to claim 2, wherein the internal frame includes a retaining member that covers at least part of a portion of the second surface of the battery that is different from the portion covered by the flexible substrate.

5. The game controller according to claim 4, wherein the retaining member is configured to protrude toward an inner side of an opening of the recess from a peripheral edge of the opening, and the flexible substrate is arranged on a side of the opening opposite to the side on which the retaining member is provided.

6. The game controller according to claim 1, further comprising
a plurality of operation members,
wherein the installation surface has a first support surface and a second support surface that are arranged such that the recess is interposed therebetween, the flexible substrate is formed in one piece, and is installed on at least the first support surface and the second support surface, and
the operation members are respectively arranged at a position corresponding to the first support surface and a position corresponding to the second support surface on the flexible substrate.

7. The game controller according to claim 1, wherein the flexible substrate is provided with flexure at the portion thereof covering the recess.

8. The game controller according to claim 1, further comprising
a vibrator accommodated in the housing,
wherein the vibrator is arranged on a side of the housing opposite to that of the battery with the internal frame interposed therebetween.

9. The game controller according to claim 1, wherein the installation surface includes an inclined surface that extends obliquely with respect to a planar direction extending along the peripheral edge of the opening of the recess, and
part of the flexible substrate is installed so as to cover the inclined surface.

* * * * *